United States Patent [19]

Kukimoto et al.

[11] Patent Number: 4,905,748
[45] Date of Patent: Mar. 6, 1990

[54] HEAVY DUTY PNEUMATIC TIRE

[75] Inventors: Takashi Kukimoto, Kodaira; Takehiro Tsukamoto, Hagashimurayama, both of Japan

[73] Assignee: Bridgestone Corporation, Tokyo, Japan

[21] Appl. No.: 166,808

[22] Filed: Mar. 3, 1988

Related U.S. Application Data

[63] Continuation of Ser. No. 875,906, Jun. 19, 1986, abandoned.

[30] Foreign Application Priority Data

Jun. 21, 1985 [JP] Japan .................. 60-134200
Jul. 10, 1985 [JP] Japan .................. 60-149892
Jul. 19, 1985 [JP] Japan .................. 60-158045

[51] Int. Cl.$^4$ ................................. B60C 3/06
[52] U.S. Cl. .......................... 152/209 A; 152/456
[58] Field of Search .......... 152/209 R, 209 A, 209 D, 152/454, 455, 456

[56] References Cited

U.S. PATENT DOCUMENTS

| | | | |
|---|---|---|---|
| Re. 26,713 | 11/1969 | Mirtain et al. | 152/455 |
| 3,155,135 | 11/1964 | Klenk | 152/456 X |
| 3,286,756 | 11/1966 | Ellenrieder et al. | 152/209 A |
| 3,410,329 | 11/1968 | Bezbatchenko, Jr. | 152/209 R |
| 3,554,259 | 1/1971 | Webb | 152/456 X |
| 3,765,468 | 10/1973 | Verdier | 152/209 A |
| 4,173,991 | 11/1979 | Mirtain | 152/209 D X |
| 4,319,620 | 3/1982 | Knill | 152/209 R |
| 4,732,194 | 3/1988 | Saneto et al. | 152/209 A |

FOREIGN PATENT DOCUMENTS

| | | | |
|---|---|---|---|
| 57-4409 | 1/1982 | Japan | 152/209 A |
| 57-147901 | 9/1982 | Japan | 152/209 D |
| 59-176104 | 10/1984 | Japan . | |
| 60-179304 | 9/1985 | Japan . | |
| 61-122008 | 6/1986 | Japan . | |

*Primary Examiner*—Raymond Hoch
*Attorney, Agent, or Firm*—Sughrue, Mion, ZInn, Macpeak & Seas

[57] ABSTRACT

A heavy duty pneumatic tire comprises a tread, two side walls, two beads, a radial carcass reinforcement, and a belt composed of at least two plies of which cords are intersected in the adjacent plies. The radius of curvature of the contour of the tread appearing in a tire cross section including a tire rotary axis is asymmetrical with respect to the tire equatorial plane. A larger radius of curvature is given to the tread portion to be located outside when the tire is mounted to a wheel, while a smaller radius of curvature is given to the tread portion to be located on the inner side when the tire is mounted to the wheel. The difference between the larger radius of curvature and the smaller radius of curvature is not less than 70 mm. The rigidity of the tread is larger on the tread portion having the larger radius of curvature than on the tread portion having the smaller radius of curvature.

34 Claims, 15 Drawing Sheets

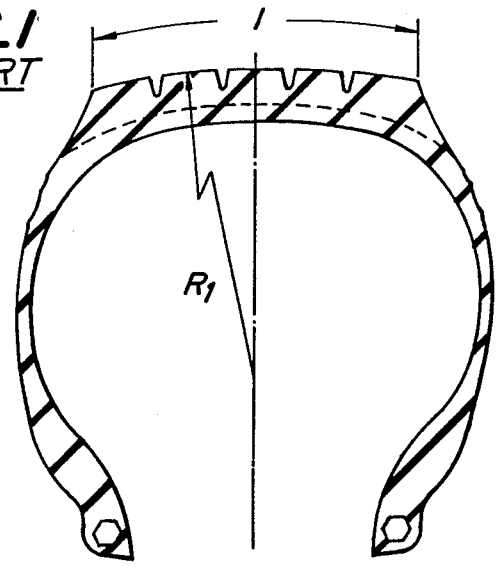
FIG._1
*PRIOR ART*
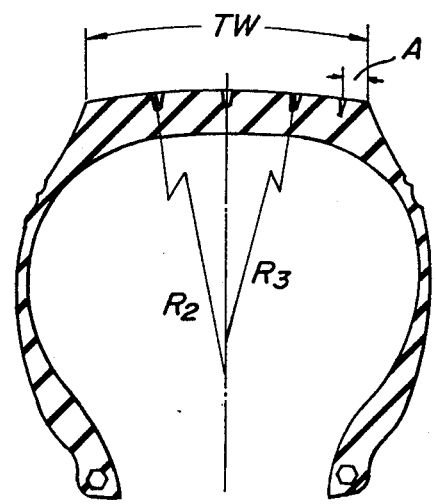
FIG._2

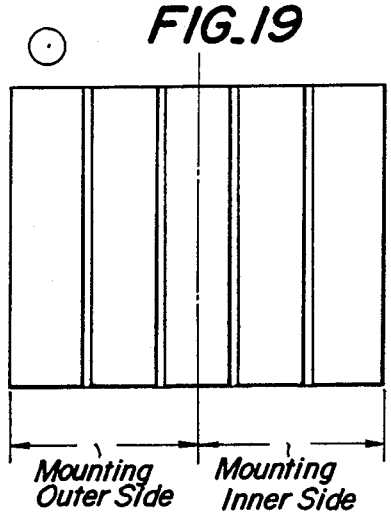
FIG_19
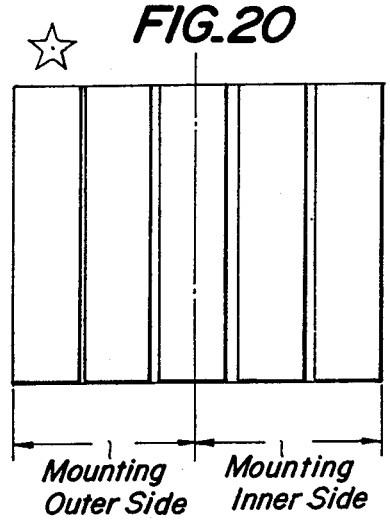
FIG_20
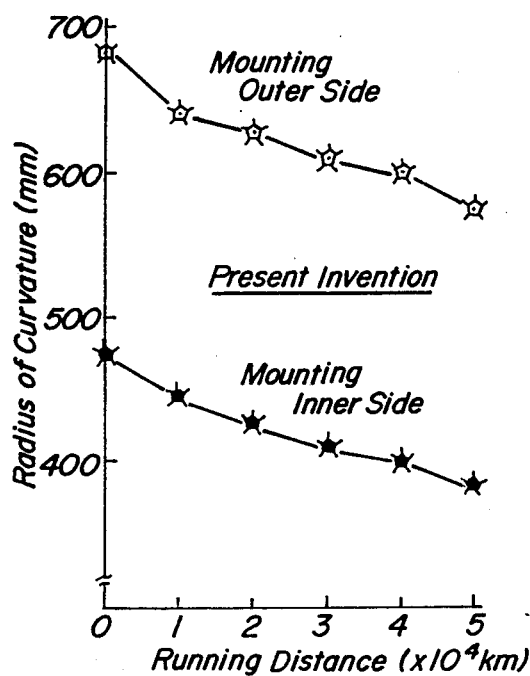
FIG_21
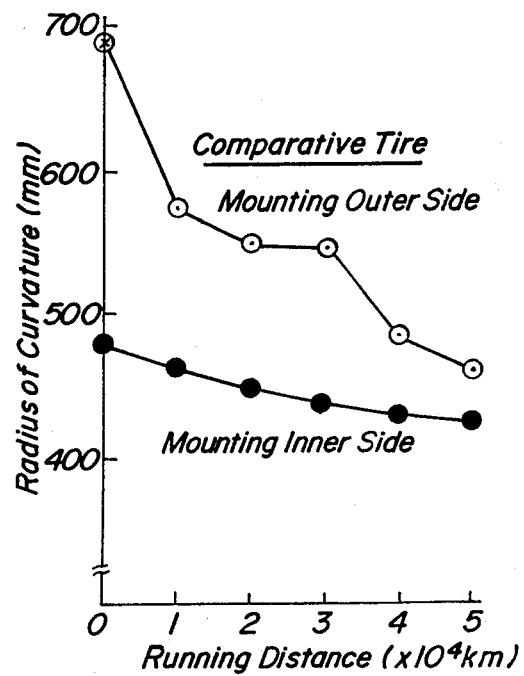
FIG_22

○ : Symmetrical Radius of Curvature Tire
△ : Asymmetrical Radius of Curvature Tire
◇ : Asymmetrical Radius of Curvature Tire with Belt Center Being Deviated

HEAVY DUTY PNEUMATIC TIRE

This is a continuation of Ser. No. 06/875,906, filed on June 19, 1986, now abandoned.

BACKGROUND OF THE INVENTION

1. Field of the Invention

The present invention relates to prevention of shoulder drop wearing at shoulder portions in heavy duty pneumatic tires. The invention also relates to an improvement for the simultaneous prevention of both shoulder drop uneven wearing at shoulder portions and river-like uneven wearing at a second rib and a center portion of a tread in heavy duty pneumatic tires. Further, the present invention relates to prevention of shoulder drop wearing at shoulder portions and one side wearing in heavy duty pneumatic tires.

2. Related Art Statement

In conventional heavy duty pneumatic tires, particularly, in heavy duty pneumatic radical tires, shoulder drop uneven wearing has frequently occurred at the shoulder portion on the outer side of a front wheel. According to the conventional heavy duty pneumatic tires, the radius of curvature is laterally symmetric, and the ground contact pressure at tread edge portions is increased while the lateral symmetry is maintained. Thereby, shoulder drop uneven wearing is suppressed.

The uneven wearing is developed mainly at the tread edge of the outer side of a tire mounted to a wheel, not on the opposite sides of the tread. This results from the fact that roads include not only straight portions but also curved portions, that is, curves. When a vehicle turns along a curve, it rolls owing to a centrifugal force. Therefore, a load increases and a lateral force concentrates at the tread edge portion on the vehicle outer side in the tread of the tire mounted on the outside in turning, so that uneven wearing is likely to be produced at the tread edge portion on the outer side in the outwardly mounted tire. In order to restrain uneven wearing, the ground contact pressure at the tread edge portions has been increased by enlarging the radius of the curvature in the laterally symmetric fashion. However, this causes an increase in cost due to an increased tread volume. Further, since on the mounting outer side is faster, there is a problem that one sided wearing is likely to be produced.

In addition to shoulder drop uneven wearing at the shoulder portions of the treads of the heavy duty pneumatic tires, particularly, radial tires, in the steering wheels, a river-like uneven wearing frequently occurs at the second rib and the center portion of the tread. As a countermeasure to prevent these uneven wears, an NR base rubber or an SBR base rubber have been selectively used as a tread rubber of the tire paying attention to either one of the shoulder drop uneven wearing and the river-like wearing. Further, as shown in FIG. 1, according to the conventional heavy duty pneumatic tires, the radius of curvature of the crown portion of the tread is laterally symmetric, and wear resistance has been partially improved by varying the radius of curvature, $R_1$, while the lateral symmetry being maintained.

However, with respect to the uneven wearing in the tread of the heavy duty pneumatic tire, the shoulder drop uneven wearing at the shoulder portions and the rib punching and the river-like uneven wearing in the second rib and the center portion often simultaneously proceed in both the steering wheel and non-steering wheel. This is because the uneven wearings proceed while both wearing due to the side force which is produced when the vehicle is turning and wearing due to the shearing force owing to the difference in diameter which is produced when the vehicle straightly runs are always combined together.

Despite these circumstances, as mentioned above, countermeasures have been made only against either one of the shoulder drop uneven wearing and the river-like uneven wearing, in which the radius of curvature of the tread is changed depending upon the input conditions while the radius of curvature is set laterally symmetric or the whole tread is selectively formed from a single rubber of the NR base rubber or the SBR base rubber alone as a tread rubber. Although the laterally symmetric curvature of the tread provides a tentatively positive effect against the wearing at the "mounting outer side" where an input is large (at a portion locating on the outer side when the tire is mounted to the wheel), the wear resisting performance of the whole tire is ultimately hardly obtained. Furthermore, selection of the rubber material can merely control the uneven wearing at either one of the shoulder portion and the second rib and the center portion. Therefore, there is a problem that both of the uneven wearings are not simultaneously restrained.

SUMMARY OF THE INVENTION

It is an object of the present invention to prevent the shoulder drop uneven wearing in heavy duty pneumatic tires.

It is another object of the present invention to simultaneously prevent the shoulder drop uneven wearing at a shoulder portion of a tread as well as the river-like uneven wearing at second ribs and the center portion of the tread in the heavy duty pneumatic tires.

It is a further object of the present invention to prevent the shoulder drop uneven wearing and one side uneven wearing in the heavy duty pneumatic tires.

According to the present invention, there is a provision of a heavy duty pneumatic tire comprising a tread, two side walls, two beads, a radial carcass reinforcement, and a belt composed of at least two plies of which cords are intersected in the adjacent plies, wherein the radius of curvature of the contour of the tread appearing in a tire cross section including a tire rotary axis is asymmetrical with respect to the tire equatorial plane, a larger radious of curvature and a smaller radius of curvature being given to sides of the tire located outside and inside when the tire being mounted to a wheel, respectively; the difference between the larger radius of curvature and the smaller radius of curvature is not less than 70 mm; and the rigidity of the trend is larger on the side of the tread with the larger radius of curvature than on the side of the tread with the smaller radius of curvature.

According to another aspect of the present invention, there is a provision of a heavy duty pneumatic tire comprising a tread, two side walls, two beads, a radial carcass reinforcement, a belt composed of at least two plies which are made of wires or cables and of which cords are intersected in the adjacent plies, wherein the radius of curvature of the contour of the tread appearing in a tire cross section including a tire rotary axis is laterally asymmetrical with respect to the tire equatorial plane, a larger radius of curvature is given to a portion of the tread to be mounted on the outer side of a wheel and a smaller radius of curvature is given to a portion of the tread to be mounted on the inner side of the wheel, the difference between the larger radius of curvature and the smaller radius of curvature is not less than 70 mm, a narrow groove is circumferentially provided in the tread shoulder portion of the tread portion with the small radius of curvature, the width and depth of said narrow groove is not more than 5 mm and not less than 30% of that of main grooves, respectively, and the location of the narrow groove is set that A/TW is from 0.02 to 0.15 in which A and TW are the distance from the edge of the tread to a position at which the narrow groove is provided and a width of the tread, respectively.

According to still another aspect of the invention, there is a provision of a heavy duty pneumatic tire, wherein the radius of curvature of a portion of a crown portion of the tread on the mounting outer side is larger than that on the mounting inner side, the opposite shoulder portions are formed from an NR (natural rubber) base rubber, and second ribs and the center portion of the tread was formed from an SBR (styrene butadiene rubber) base rubber.

According to the above aspect, it is preferable that the boundary between NR base rubber and the SBR base rubber is positioned at the center of a circumferential main groove extending in the tire circumferential direction between the shoulder portion and the second rib.

According to this aspect, it is further preferable that the NR base rubber contains not less than 80 PHR of NR. According to this aspect, it is also preferable that the SBR base rubber contains not less than 30 PHR of SBR.

According to a further aspect of the present invention, there is a provision of a heavy duty pneumatic tire in which the radius of curvature of the contour of a tread appearing in a cross section of the tire containing a tire rotary axis of the tire is laterally asymmetrical with respect to the equatorial plane of the tire; the area ratio of grooves to be brought into no contact with the ground in the tread surface (hereinafter also referred to as "negative ratio") is from 5 to 30% in the tread portion with a larger radius of curvature and from 10 to 40% in the tread portion with a smaller radius of curvature; and the area ratio in the tread portion with the larger radius of curvature is smaller than that in the tread portion with the smaller radius of curvature.

According to a still further aspect of the present invention, there is a provision of a heavy duty pneumatic tire in which the radius of curvature of the contour of the tread appearing in a tire cross section including a tire rotary axis is laterally asymmetrical with respect to the tire equatorial plane, a larger radius of curvature is given to a tread portion to be mounted on the outer side of the tire wheel mounted to a wheel and a smaller radius of curvature is given to a tread portion to be mounted on the inner side of the tire mounted to the wheel, the difference between the larger radius of curvature and the smaller radius of curvature is not less than 70 mm, the center of a width in a tire rotary axis direction of at least one of plural belt layers is deviated toward the mounting outer side of the tire as mounted from the tire equatorial plane.

As compared with a case in which the radius of curvature is increased in both the outer side and the inner side of the tire, a ground contact pressure on the mounting outer side can be effectively increased and the uneven wear produced on the mounting outer side can be effectively restrained by enlarging the radius of curvature on the mounting outer side. Since the mounting inner side of the tire is provided with a smaller radius of curvature from the beginning although the wearing is faster on the mounting outer side, one side uneven wearing is difficult to occur and can be effectively restrained. Further, since the volume of the tread needs not be varied, cost is not raised. The uneven wearing due to the fact that the ground contact pressure on the side with the smaller radius of curvature, that is, on the mounting inner side, is lower can be prevented by the provision of a fine groove in the mounting inner side of the tread shoulder portion. This is because the progress of the uneven wearing is once stopped by the discontinuity due to the presence of the groove when the uneven wear progresses to the narrow groove. Therefore, since the ground contact pressure is increased in the rib inside of the narrow groove by the outer side rib which shares the load, the inside rib is unlikely to be unevenly worn. Further, any mistake is avoided by the provision of the narrow groove in the mounting inner side of the tread shoulder when the radius of the curvature is discerned, and mistake is also avoided by designing the pattern to have the asymmetrical profile with respect to the tire equatorial plane when the tire is mounted on the vehicle. Since the thickness of the tread is larger in the side with the larger radius of curvature, that is, in the tread on the mounting outer side, it is preferable from the standpoint of the wear resistance that the depth of the main groove is made so deeper there by the difference in the thickness of the tread that the depth of the grooves may become the same when the radius of curvature becomes uniform through wearing. When the sectional profile of the fine groove is designed in a tear-like profile, the radius of the curvature of the tire mounted to the front shaft becomes smaller and the ground contact pressure at the tread shoulder portion becomes lower. However, the ground contact area becomes smaller as wearing proceeds. Thus, it has the function to restrain the decrease in the ground contact pressure per unit area.

Further, the uneven wearing at the shoulder portions, the second rib and the center portion of the tread can be remarkably reduced by the synergistic effect resulting from the combination of the asymmetrical radius of curvature of the tread crown portion and the use of different kinds of rubber materials.

In addition, the shoulder drop uneven wearing as well as the one side uneven wearing can be effectively prevented by the asymmetrical radius of curvature of the tread crown portion and the smaller negative ratio on the mounting outer side of the tread.

These and other objects, features and advantages of the present invention will be well appreciated upon reading of the following description of the invention when taken in connection with the attached drawings with understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 1 is a cross sectional view of a prior art heavy duty pneumatic tire;

FIG. 2 is a cross sectional view of a heavy duty pneumatic tire as one embodiment according to the present invention;

FIG. 19 is a developed view of a tread of a comparative heavy duty pneumatic tire;

FIG. 20 is a developed view of a tread of a heavy duty pneumatic tire according to the present invention;

FIGS. 21-23 are diagrams showing the relation between the running distance and the radius of curvature;

DETAILED DESCRIPTION OF THE INVENTION

Figure 3:
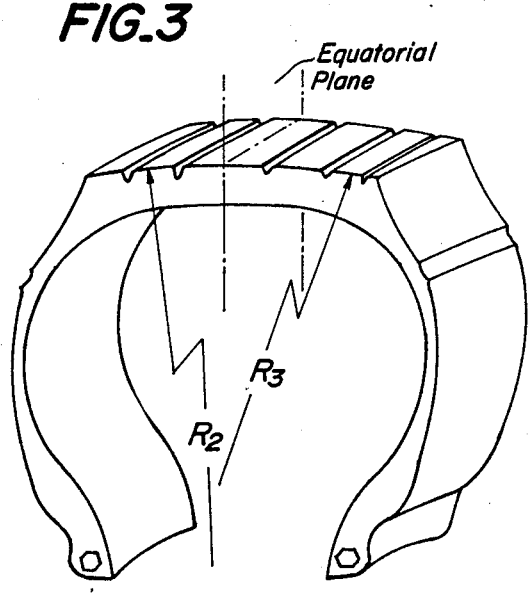
FIG. 3 is a perspective sectional view of the heavy duty pneumatic tire shown in FIG. 2.

The heavy duty pneumatic tire according to the present invention is characterized in that the contour of the crown portion of the tread of the tire is designed in an asymmetrical radius of curvature with respect to the tire equatorial plane in which a larger radius of curvature is given to a tread portion to be located on the outer side of a wheel to which the tire is mounted (mounting outer side) and a smaller radius of curvature is given to a tread portion to be located on the inner side of the wheel to which the tire is mounted (mounting inner side); the difference between the larger radius of curvature and the smaller radius of curvature is not less than 70 mm; and that the rigidity of the tread is larger in the tread portion on the mounting outer side than in the tread portion on the mounting inner side. The last feature is attained by any one of the following measures:

(1) A narrow groove is provided in the tire-circumferential direction in the tread portion on the mounting inner side with the smaller radius of curvature, and the width and the depth of the narrow groove are not more than 5 mm and not less than 30% of that of main grooves provided in the tread, respectively, while the location of the narrow groove is set such that A/TW is from 0.02 to 0.15 in which A is a distance from the tread edge to the narrow groove and TW is the width of the tread.

(2) The opposite shoulder portions of the tread are made of an NR base rubber and second ribs and the center portion of the tread are made of an SBR base rubber in addition to the asymmetrical radius of curvature of the tread.

(3) The area ratio of the surface of the tread portion which is not in contact with the ground is from 5 to 30% in the tread portion with the larger radius of curvature and from 10 to 40% in the tread portion with the smaller radius of curvature, and the area ratio in the tread portion with the larger radius of curvature is smaller than that in the tread portion with the smaller radius of curvature.

(4) The center of the width in the tire rotary axis direction of at least one of plural belt layers is deviated toward the mounting outer side of the tire from the tire equatorial plane.

The present invention will be explained in more detail with reference to the attached drawings.

Tire having a tire size of 11 R 22.5, 16 PR were experimentally prepared. A tire with an asymmetrical radius of curvature and a narrow groove provided at the tread shoulder portion on the smaller radius of curvature side was prepared as a tire according to the present invention. In FIG. 2, the radius of curvature were $R_2=680$ mm and $R_3=470$ mm, and the location of the narrow groove was $A/TW=0.05$. Two kinds of tires with a symmetrical radius of curvature or with an asymmetrical radius of curvature were experimentally prepared as conventional tires. In the tire with the symmetrical radius of curvature shown in FIG. 1, $R_1=560$ mm. In the tire with the asymmetrical radius of curvature, the radii of curvature were $R_2=680$ mm, and $R_3=470$ mm. Test conditions were that the internal pressure was 7.75 kg/cm$^2$, a test vehicle was 2-D-4 vehicle with a flat body, a loading percentage was 100% and a mounting location was a front shaft. Tires were mounted on the front shafts of the vehicles of the same type, and subjected to 50,000 km running while being exchanged every 5,000 km among the vehicles at the same mounting location to remove difference among the vehicles.

Figure 4:
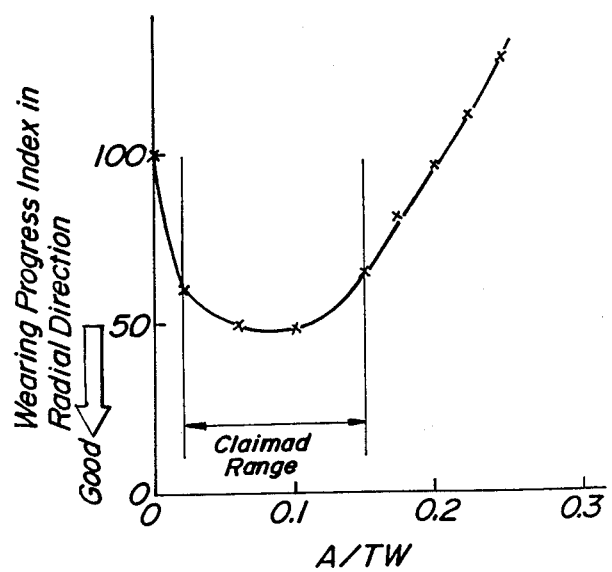
FIG. 4 is a diagram showing the relation between the wearing progress index in the radial direction and the ratio of the distance of the narrow groove from the tread edge to the tread width in the heavy duty pneumatic tires according to the present invention.
Figure 5:
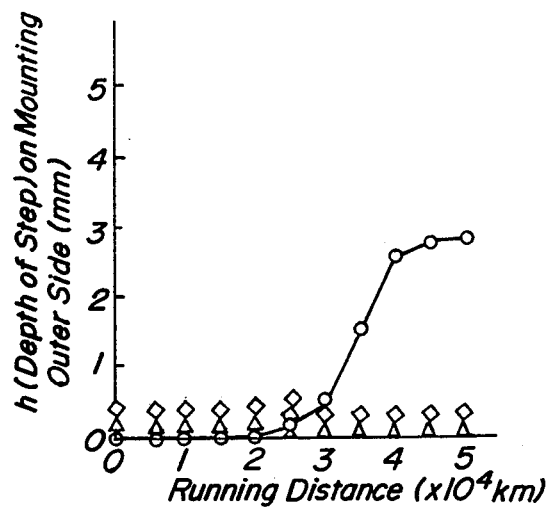
FIGS. 5, 6, 7 and 8 are relations of the shoulder drop wearing on the mounting outer side and on the mounting inner side to the running distance in the heavy duty pneumatic tires according to the present invention and the prior art.
Figure 6:
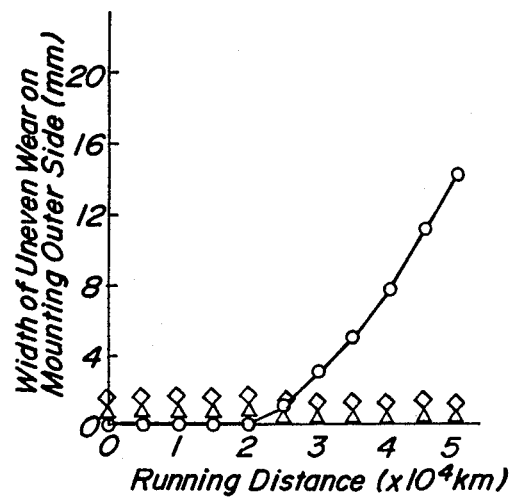
Figure 7:
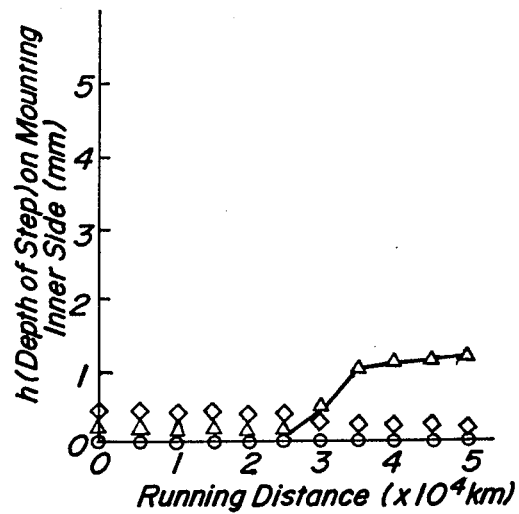
Figure 8:
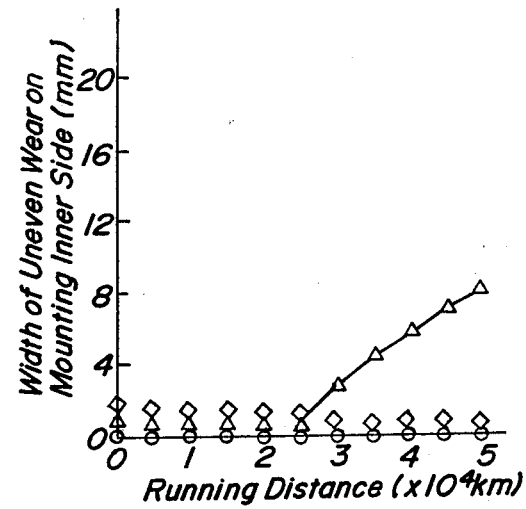
Figure 9:
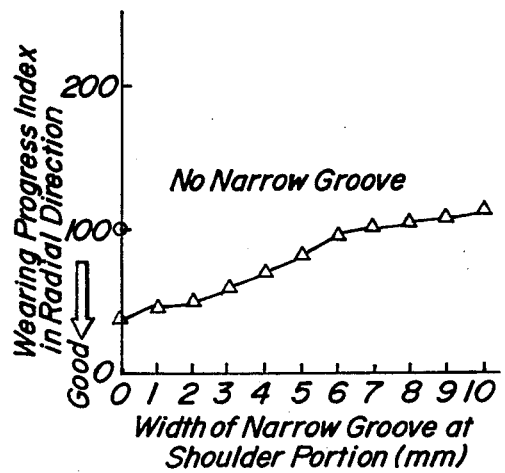
FIGS. 9 and 10 are diagrams showing the relation between the wearing progress index to the width of the narrow groove or the depth of the narrow groove.
Figure 10:
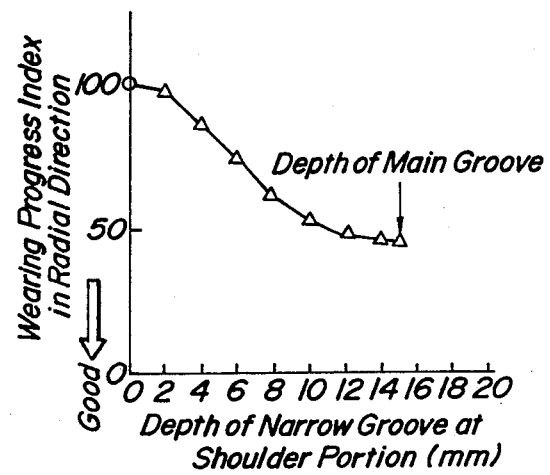
Figure 11:
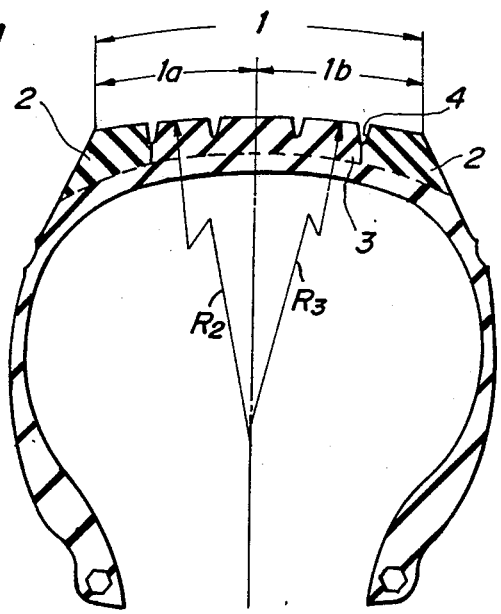
FIG. 11 is a sectional view of a heavy duty pneumatic tire according to another embodiment of the present invention.

Effects of the present invention will be explained with reference to FIGS. 4 to 9. FIG. 4 shows a progress index of wearing in radial direction with respect to the location of the narrow groove. "A" shows the distance of the narrow groove from the tread edge, and "TW" shows the width of the tread. A/TW is a ratio therebetween. As shown in FIG. 4, the effect is obtained when the ratio is from 0.2 to 0.15. FIGS. 5, 6, 7 and 8 are diagrams in respect to the tire with the symmetrical radius of curvature, the tire with the asymmetrical radius of curvature, and the tire with the asymmetrical radius of curvature and the narrow groove. "o", "Δ" and "◇" denote the tire with the symmetrical radius of curvature, the tire with the asymmetrical radius of curvature, and the tire with the asymmetrical radius of curvature and the narrow groove, respectively. With respect to the shoulder portion on the mounting outer side, shoulder drop wearing occurred in the conventional tire with the symmetrical radius of curvature, while no shoulder drop wearing occurred in the tires with asymmetrical radius of curvature. With respect to the shoulder portion on the mounting inner side, the shoulder drop wearing occurred in the conventional tire with the asymmetrical radius of curvature, while no shoulder drop wearing occurred in the tire according to the present invention with the asymmetrical radius of curvature and the narrow groove. FIG. 9 is a diagram showing the effect of the narrow groove. The most excellent effect is obtained in the case of the tire with a slit having a groove width of zero, with respect to the narrow groove on the small radius of curvature crown side. As compared with the case of no narrow groove, it is considered that there is an effect until the width of the narrow groove is not more than 5 mm. Thus, the width "W" of the narrow groove at the shoulder portion is $0 \leq W \leq 5$ mm. FIG. 10 shows the effect with respect to the depth of the narrow groove. With respect to the depth of the narrow groove, the level of the wearing (level as to whether the wearing is 30% or 100%) must be taken into consideration. In order to obtain the maximum effect, the depth of the narrow groove should be the same as that of the main groove. However, since it is considered that rib tear etc. may occur, the depth of the narrow groove is set to the lower limit of 30% of the depth of the main groove which is considered to be effective at least when the tire is fresh. Thus, the depth of the narrow groove is not less than 30% of that of the main groove.

Next, the second aspect of the present invention will be explained below.

When the radius of curvature, $R_2$, of the tread on the mounting outer side of $1a$ is made larger than the radius of curvature, $R_3$, of the mounting inner side $1b$, the ground contact pressure at the shoulder portion 2 on the mounting outer side $1a$ can be increased, thereby restraining the progress of the uneven wearing (mainly, the shoulder drop wearing) due to the shearing force originated from the diameter difference. In this case, the wearing due to the side force is faster in the mounting outer side $1a$. However, since the radius of curvature in the mounting inner side $1b$ is designed smaller from the beginning, the one side wearing is relatively unlikely to occur. But, a river-like uneven wearing is inversely more likely to occur in the edge of the second rib of shoulder portion 2 on the mounting outer side $1a$ with the larger radius of curvature due to the side force and the ground contact pressure. In particular, the uneven wear occurrence percentage is high in the case of the NR base tread rubber. Therefore, according to the present invention, high modulus effect, that is, the crashing resistant effect resulting from the use of the SBR base rubber under tire use conditions is utilized to cope with this; however, although the use of the SBR base rubber is effective with respect to the river-like uneven wearing and the punch-like uneven wearing at the second rib, the levels of restraining the shoulder drop wearing and the one side wearing at the shoulder portion 2 inversely lower as compared with the NR base rubber. In order to cope with the uneven wearing consisting of these two different phenomena simultaneously, it is necessary that NR base rubber and SBR base rubber are arranged in the shoulder portion 2, and the second rib and the center portion 3, respectively, and the radius of curvature, $R_2$, of the mounting outer portion $1a$ is made larger to control the ground contact pressure. In such a way, when the profile of the crown portion of the tread is designed asymmetrical, and the shoulder portion 2 and the second rib and the center portion 3 are formed by the NR base rubber and the SBR base rubber, respectively, the effect of the asymmetry and the effect of the combination of the different kinds of the rubbers are not only merely combined together, but also the entirety of uneven wearing countermeasures can be obtained by the synergistic effect in with both effects act upon each other as mentioned later. The combination of the different kinds of the rubbers is an effective countermeasure against uneven wearing as well as the phenomena such as the river-like tear and sipe tear which occur when the SBR base rubber is used in the shoulder portion 2.

When the NR base rubber and SBR base rubber are used in combination, if the boundary plane of the NR base rubber and the SBR base rubber is positioned on the surface of the tread, a step is produced on the surface of the tread due to the difference in wear resistance. This causes unfavorable results on the outer appearance and the motion performances.

In order to eliminate this disadvantage, it is preferable that the boundary between the NR base rubber and the SBR base rubber, that is, between the shoulder portion 2 and the second rib and the center portion 3 is located inside of the main circumferential groove 4 extending in the circumferential direction between the shoulder portion 2 and the second rib $2a$. By doing so, the influence due to the boundary does not appear until the tread becomes completely worn. Thus, the production of uneven wearing due to the above step can be restrained.

Figure 12:
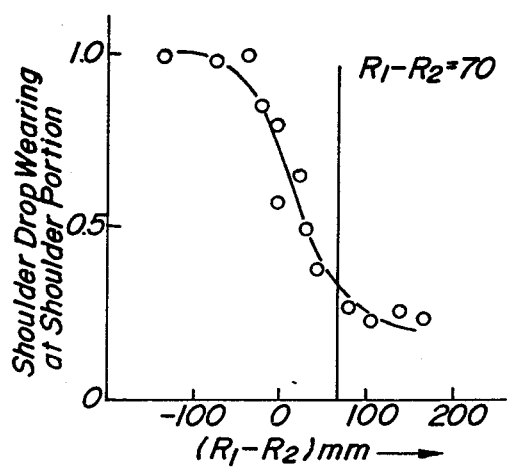
FIG. 12 is a diagram showing the relation between the difference in the radius of curvature in the tread crown and the shoulder drop wearing at the shoulder portion in tires each having an asymmetrical radius of curvature.

Further, according to the present invention, the larger the difference ($R_2-R_3$) between the radius of curvature, $R_2$, on the mounting outer side portion $1a$ and the radius of curvature, $R_3$, on the mounting inner side portion $1b$ in the tread crown portion, is better from the standpoint of the occurrence percentage of the shoulder drop uneven wearing at the shoulder portion as shown in FIG. 12. It is required to be not less than 70 mm. The upper limit of the difference ($R_1-R_2$) can be determined from the balance of the motion performances, i.e. wearing at the mounting inner side portion, etc. In FIG. 12, results are shown by index while the worst wearing is taken as 1.0.

Figure 13:
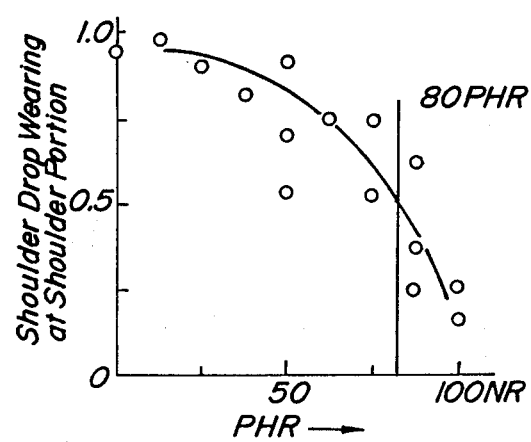
FIG. 13 is a diagram showing the relation between the NR base rubber compounding ratio and the shoulder drop wearing at the shoulder portion.

As shown in FIG. 13, as the NR base rubber used in the shoulder portion, the NR base rubber in which NR is not less than 80 PHR and BR is the remainder in the whole polymer ratio in the tread rubber composition is preferably used. In FIG. 13, results are shown by index while the worst wearng is taken as 1.0.

Figure 14:
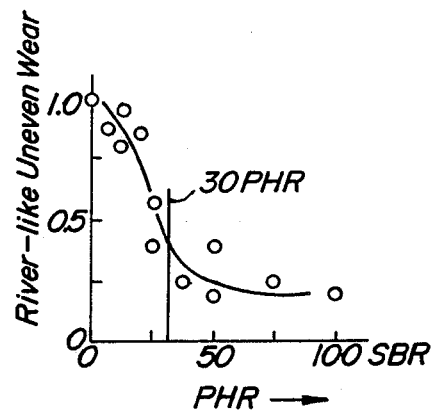
FIG. 14 is a diagram showing the relation between the SBR base rubber compounding ratio and the river-like uneven wearing.

As the SBR base rubber used in the second rib and the center portion, as shown in FIG. 14, a blended rubber in which SBR occupying percentage is not less than 30 PHR and the remainder is NR (main component) or BR in the whole polymer percentage is preferable from the standpoint of the river-like uneven wear. In FIG. 14, index indication is made while the worst wearing is taken as 1.0.

In order to examine the effects resulting from the radius of curvature of the tread crown portion and the combination of the tread rubbers, one kind of a tire according to the present invention and five kinds of comparative tires were prepared, and uneven wearing was examined.

(1) Symmetrical radius of curvature tire ($R_1=550$ mm)+NB base rubber (2) Symmetrical radius of curvature tire ($R_1=550$ mm)+SBR base rubber (3) Symmetrical radius of curvature tire ($R_1=550$ mm)+NR/SBR/NR (4) Asymmetrical radius of curvature tire ($R_2=650$ mm, $R_3=480$ mm)+NR base rubber (5) Asymmetrical radius of curvature tire ($R_2=650$ mm, $R_3=480$ mm)+SBR base rubber (6) Asymmetrical radius of curvature tire ($R_2=650$ mm, $R_3=480$ mm)+NR/SBR/NR NR base rubber was NR:BR=90:10, while SBR base rubber was NR:SBR=50:50.

The tire size was 11R 22.5, 16 PR, and test conditions are as follows:

Vehicle type: 2-D-4 vehicle (Tire: two tires in a front wheel, four tires in a rear drive shaft, and four tires in a rear free shaft)

Internal pressure: 7.75 kg/cm$^2$ ·

Loading percentage: 100%

Mounting position: front shaft.

Two tires were mounted in the front shafts (FL, FR) of each of six vehicles of the same type, and run until 50,000 km while the vehicles and the tires were exchanged every 5,000 km with the mounting position being fixed to correct the difference amount the vehicles.

Figure 15:
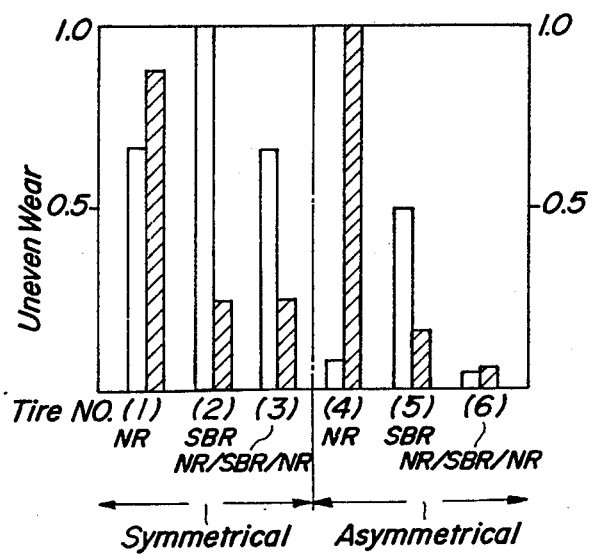
FIG. 15 is a diagram showing the wearing amount at the shoulder portion and the second rib and the center portion in various combinations of the radii of curvature at the tread crown and the tread rubbers.

The uneven wear state after the 50,000 km running was examined, and results thereof are shown by a histogram in FIG. 15. While columns and shadowed columns show the wear amounts of the shoulder portion and the second rib and the center portion, respectively. Results are shown by index while the worst one is taken as 1.0.

As evident from the diagram of FIG. 15, according to the present invention, uneven wearing can be extremely reduced at the shoulder portion and the second rib and the center portion by the synergistic effect due to the combination of the asymmetrical radius of curvature of the tread crown portion and the rubbers in the tread.

The third aspect of the present invention will be explained below.

Figure 16:
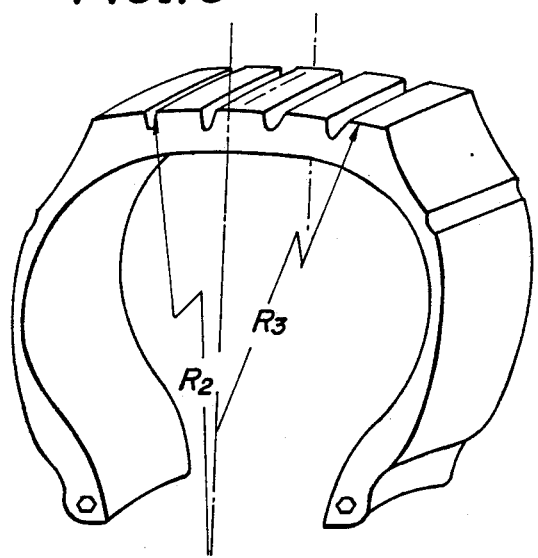
FIG. 16 is a perspective sectional view of a heavy duty pneumatic tire as a still another embodiment according to the present invention.
Figure 17:
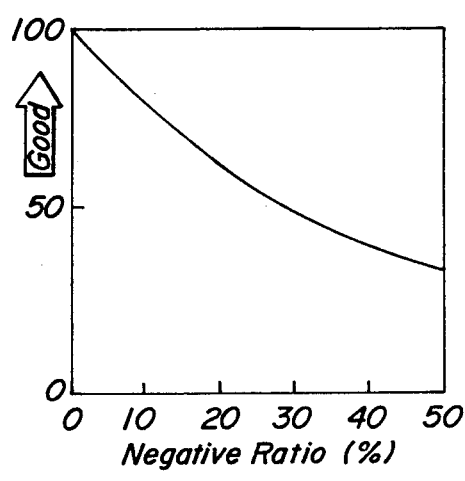
FIG. 17 is a diagram showing the relation between a negative ratio and the wear resistance index.

As shown in FIG. 16, when the negative ratio of the tread is varied, the wearing speed changes. When the negative ratio is equal in both the sides having the larger radius of curvature and the smaller radius of curvature, an input of the external force (in cornering, etc.) to the side having the larger radius of curvature which is positioned on the mounting outer side is larger and the wearing speed in higher. Consequently, since the asymmetry of the radius of curvature can not be maintained, so that the radius of curvature on the mounting outer side becomes smaller as the wearing progress as compared with the mounting inner side.

According to the present invention, the ground contact pressure and the ground contact rigidity of the tread on the mounting outer side are increased by combination of the asymmetrical radius of curvature and control of the negative ratio dominating the wearing speed, thereby improving the shoulder drop wearing and one side wearing on the mounting outer side.

According to the tire of the present invention, the negative ratio is set at the above 5–30% and 10–40% in the sides having the larger radius of curvature and the smaller radius of curvature, respectively. If the negative ratio is too small, the water discharging performance is deteriorated. If it is too large, the wear resistive performance is damaged. Further, the difference in the radius of curvature being not less than 70 mm is effective against shoulder dropping.

Figure 18:
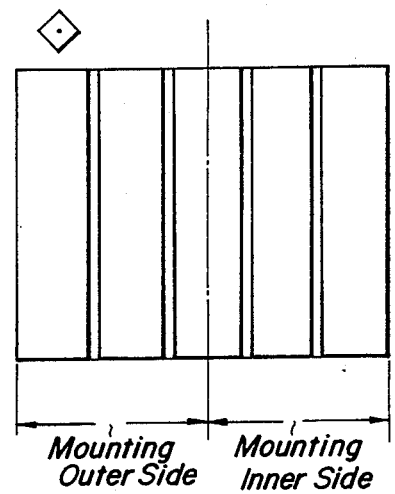
FIG. 18 is a developed view of a tread of a prior art heavy duty pneumatic tire.

FIGS. 1 and 16 show cross sectional views of tires according to the prior art and present invention. The radius of curvature ($R_1$) of the contour of the tread of the tire of FIG. 1 is 580 mm and the tread is shown in FIG. 18. The negative ratio is 12% in both the mounting inner side and the mounting outer side. The radius of curvature of the contour of the tread on the mounting outer side and the mounting inner side of FIG. 16 are $R_2=690$ mm and $R_3=470$ mm, respectively, the difference therebetween being 220 mm. FIG. 20 shows the tread thereof in which the negative ratio is 12% in the mounting outer side and 30% in the mounting inner side.

Other examples are shown in FIGS. 24a to 28b, the negative ratios thereof being shown in the following Table 1.

According to the tire of the present invention, the depth of the groove of the outermost side of the mounting outer side is designed deeper than that of the other. Since the depth of the outermost side groove can be deeper due to the thicker gauge of the tread owing to the larger radius of curvature on the mounting outer side, the durable life can be prolonged.

TABLE 1

Figure 24A:
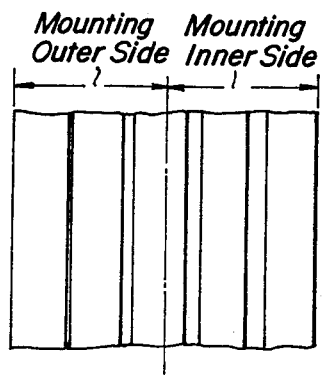
FIGS. 24a to 28a are developed views of treads of heavy duty pneumatic tires according to the present invention.
Figure 24B:
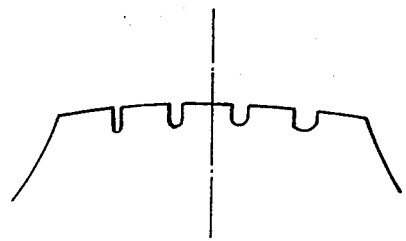
Figure 25A:
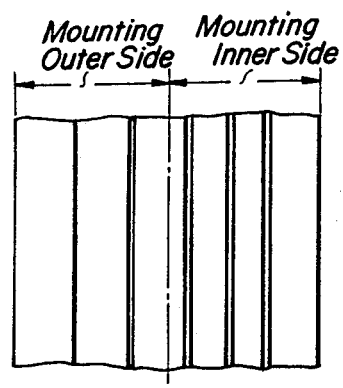
Figure 25B:
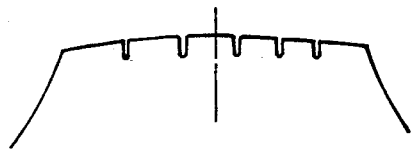
Figure 26A:
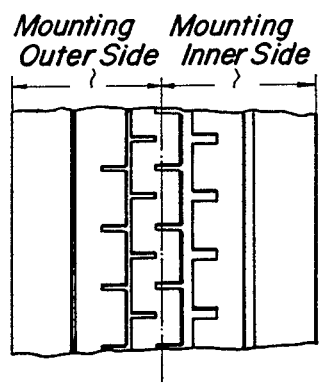
Figure 26B:
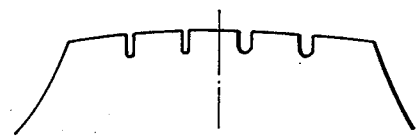
Figure 27A:
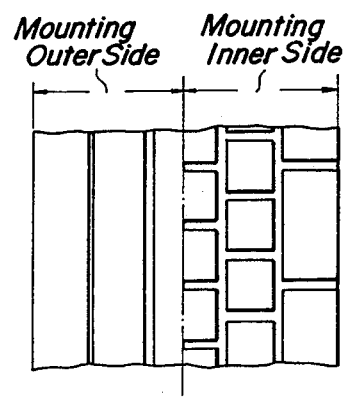
Figure 27B:
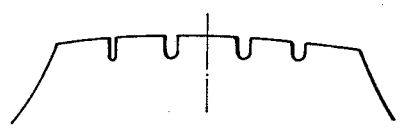
Figure 28A:
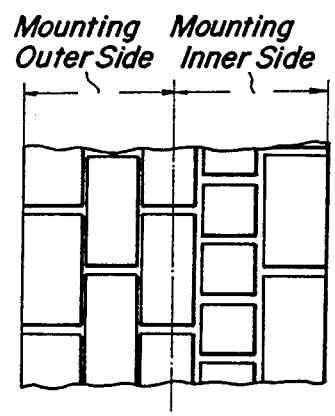
Figure 28B:
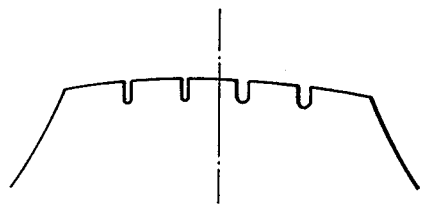

| | Negative ratio | |
| --- | --- | --- |
| | Mounting outer side | Mounting inner side |
| FIG. 24b | 12% | 28% |
| FIG. 25b | 10% | 20% |
| FIG. 26b | 12% | 21% |
| FIG. 27b | 12% | 24% |
| FIG. 28b | 14% | 20% |

A tire in FIG. 16 (tread in FIG. 20), a tire in FIG. 1 (tread in FIG. 18) and a comparative tire (tread in FIG. 19, the radius of curvature being the same as in FIG. 16) were subjected to an uneven wearing performance comparison test in actual run.

Experimental conditions

Figure 23:
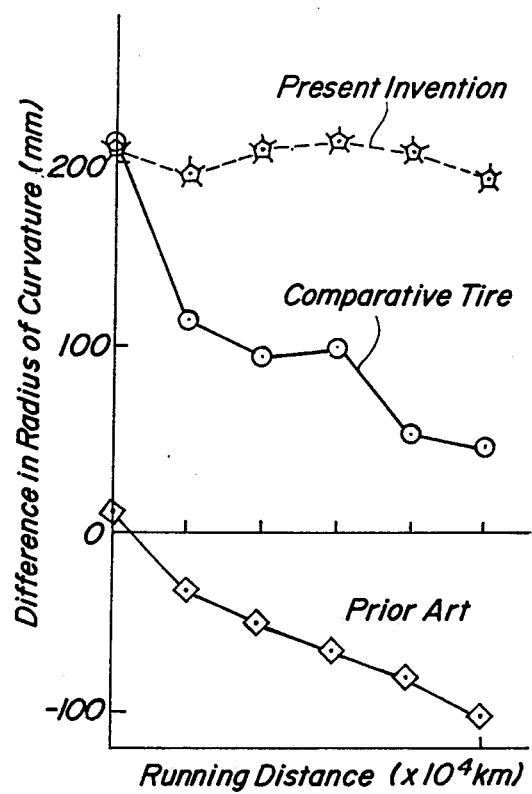

Vehicle: truck—two front wheel and four rear wheel type
Mounting location: front wheel
Running road: general road 30%, and high speed road 70%
Tire size: 11 R 22.5, 16 PR
Internal pressure: 7.75 kg/cm²
Loading percentage: 100%
Toe-in amount: 3 mm Experimental results are shown in FIGS. 21-23. FIG. 21 shows changes in radius of curvature as the tire according to the present invention was run, while FIGS. 22 and 23 show results in the comparative tire and the difference in the radius of curvature during running, respectively. It is seen from these figures that while the radius of curvature according to the conventional tires become smaller in the mounting outer side than in the mounting inner side owing to the shoulder drop wearing or one side wearing as the tires run, the difference in the radius of curvature between the mounting outer side and the mounting inner side is not almost changed during running and the occurrence of the shoulder drop wearing on the mounting outer side was not observed even after running 50,000 km.

According to the tire of the present invention, since the share of the ground contact pressure on the mounting inner side is lowered due to the smaller radius of curvature of the tread on this side, the ground contact pressure of the tread edge portion on the mounting outer side is higher and the shoulder drop wearing progress can be retarded as compared with the symmetrical tread tire. Further, since the negative ratio on the tread on the mounting outer side is smaller, the ground contact rigidity there becomes higher and the one side uneven wearing can be effectively prevented.

Thus, although the radius of curvature is made larger by increasing the volume of the tread according to the conventional symmetrical tread tire, in the asymmetrical tread tire of the present invention, the uneven wearing can be restrained, without increasing the volume of the tread to a large amount, by enlarging the radius of curvature of the contour of the tread on the mounting outer side as compared with the mounting inner side.

The fourth aspect of the present invention will be described below.

Figure 29:
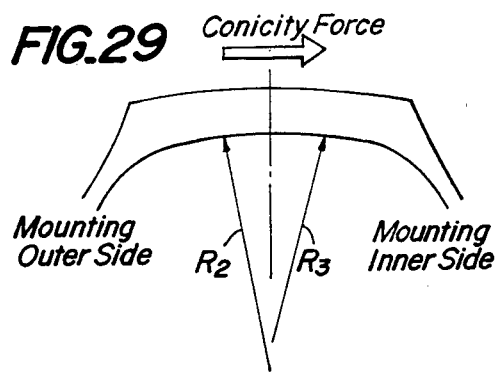
FIG. 29 is a schematic sectional view of a heavy duty pneumatic tire illustrating a conicity forced.
Figure 30:
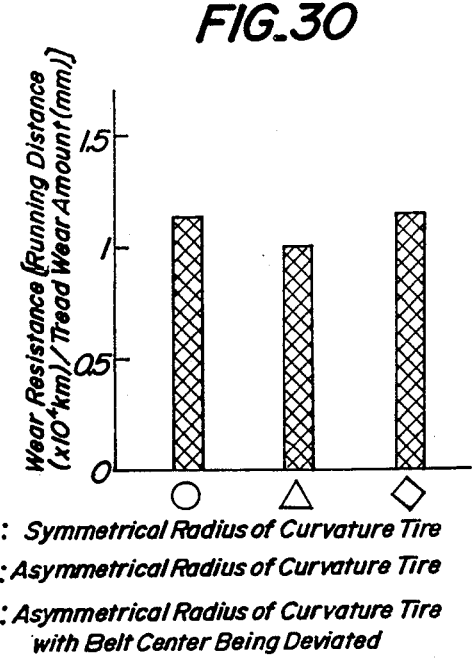
FIG. 30 is a histogram comparing heavy duty pneumatic tires with respect to the wear resistance.

A lateral force to the tire from the road is produced in a direction from a crown portion having the larger radius of curvature to a crown portion having the smaller radius of curvature when the radius of curvature of the crown is made asymmetrical with respect to the tire equatorial plane (see FIG. 29). In general, the lateral force to be produced in the same direction of the tire is called conicity force irrespective of the rotational direction. This force increases a share of the input on the vehicle mounting outer side, so that the entire wear (uniform wear) amount of the tread is increased as compared with the tire (o) having the symmetrical radius of curvature at the crown (see FIG. 30). In FIG. 30, the wear resistance of the symmetrical tread tire (Δ) is taken as 1.

Under the circumstances, according to the present invention, the center of the width in the rotational axis direction of at least one plural belt layers is deviates toward the crown portion having the larger radius of curvature to reduce the conicity force. By doing so, the rigidity of the tread at the crown portion with the larger radius of curvature is increased as compared with that at the crown portion with the smaller radius of curvature, thereby producing a reverse force to the conicity force based on the profile of the tire. Thus, the conicity force of the whole tire is offset. Thereby, the wear resistance of the whole tread can be improved.

Figure 31:
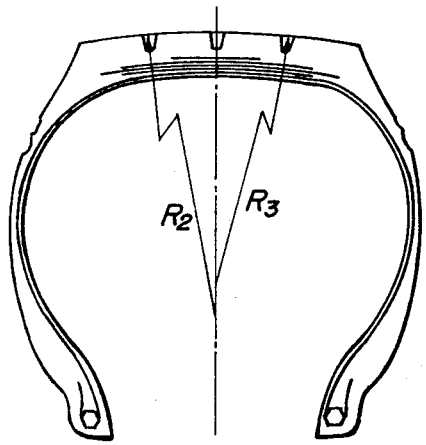
FIG. 31 is a sectional view of a prior art heavy duty pneumatic tire.
Figure 32:
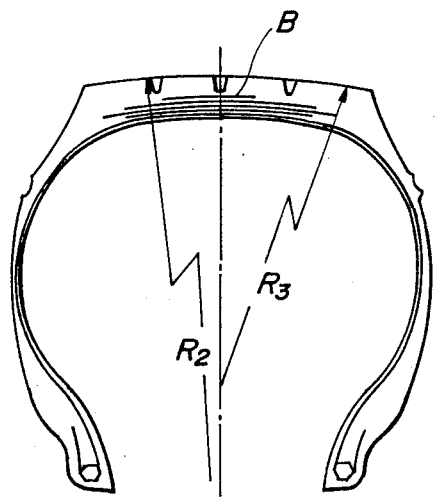
FIG. 32 is a sectional view of a heavy duty pneumatic tire as a further embodiment according to the present invention.
Figure 33A:
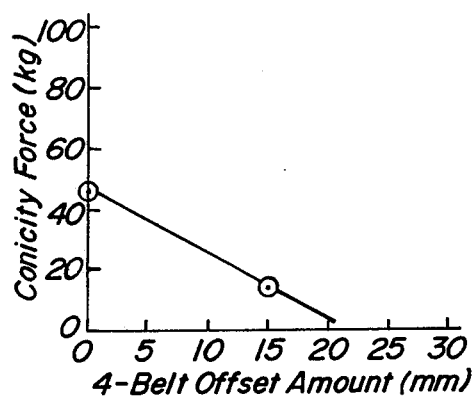
FIG. 33a is a diagram showing the relation between the 4 belt offset amount and the conicity force.
Figure 33B:
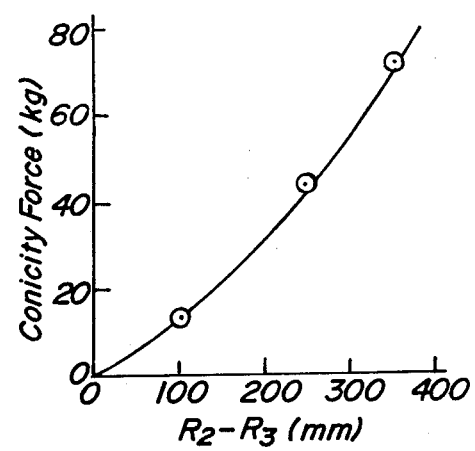
FIG. 33b is a diagram showing the relation between the difference in radius of curvature and the conicity force.

FIG. 33a is a diagram showing the relation between the deviating amount (belt offset amount) by which the center of the width of the radially outermost belt layer B of the tire shown in FIG. 31 is deviated in the tire rotary axis direction and the conicity force produced thereby. FIG. 33b shows the relation between the profile of the crown portion and the conicity force resulting therefrom.

The optimum value of the deviating amount of the belt layer B can be determined from the above relations (FIGS. 33a and b).

Comparison tests were carried out in the following Examples with respect to the wearing and uneven wearing on the whole tread.

Tire size: 10.00 R 20
Internal pressure: 7.25 kg/cm²
Vehicle type: 2-d-4 vehicle, flat body truck
Loading percentage: 100%
Mounting position: front shaft
Tire kind: three kinds
(A pair of tires were prepared for each kind.)
Symmetrical radius of curvature tire (crown: $R_1 = 560$ mm)
Asymmetrical radius of curvature tire ($R_2 = 700$ mm, $R_3 = 470$ mm)
Asymmetrical radius of curvature tire ($R_2 = 700$ mm, $R_3 = 470$ mm) with the outermost belt layer (4-belt) having the center being outwardly deviated by 15 mm.

Each pair of three kinds of the tires were mounted to three respective vehicles of the same type and subjected to 50,000 km running while being exchanged every 5,000 km as the tire mounting positions being maintained, thereby removing the difference among the vehicles. Alignment was such that the camber was maintained as set by a car manufacturer and the toe-in was 3 mm.

Figure 34:
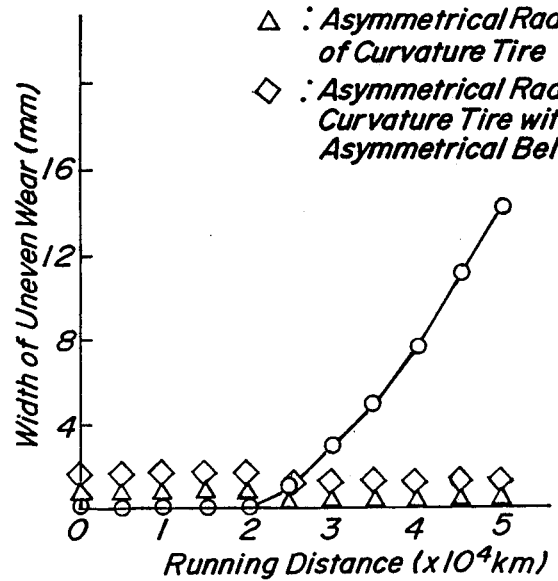
FIG. 34 is a diagram showing the relation between the running distance and the width of uneven wearing.

From test results, it was revealed that according to the present invention, no uneven wearing was produced until 50,000 km running as shown in FIG. 34, and the wearing of the whole tread was less as compared with the conventional tires as shown in FIG. 30.

Figure 35:
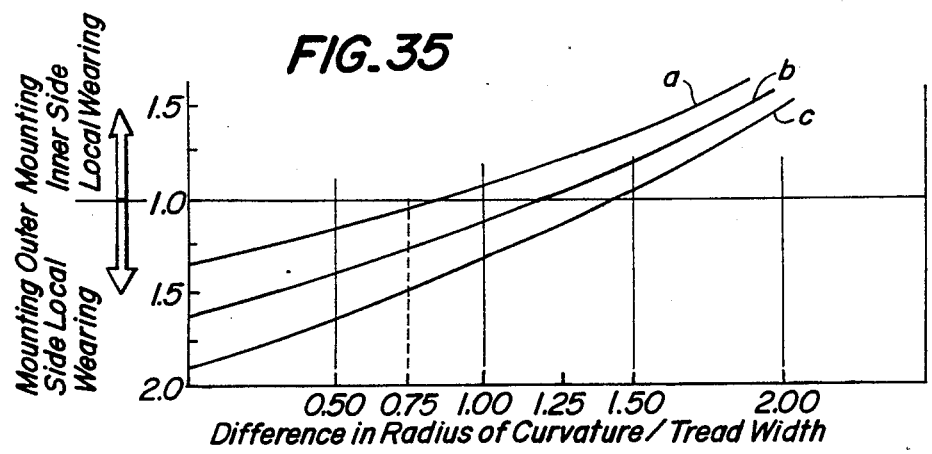
FIG. 35 is a diagram showing the relation between the difference in radius of curvature/tread width and the ratio in wearing between the mounting outer side and the mounting inner side.

The ratio in wearing between the mounting outer side and the mounting inner side of the tread was determined through a simulating calculation based on some actual experiences while the radii of curvatures on the mounting inner side and the mounting outer side were varied. Results are shown in FIG. 35. Wear amounts were measured at points inwardly located at one fourth of the width of the tread from the outer edges of the tire with respect to each of the mounting inner side and the mounting outer side. Test conditions were the same given in page 25. In this experiment, each tire was mounted on a front wheel of a 2-D-4 vehicle such that a tread portion having the larger radius of curvature might be located on the mounting outer side. Curves a, b and c in FIG. 35 denote results in the cases of running on a high speed road, a general road and a mountainous road, respectively. A lateral force G applied to the tire in the respective roads are shown in Table 2. In FIG. 35, an abscissa denotes the ratio of the differences in the radius of curvature (CR difference) between the mounting outer side and the mounting inner side to the tread width TW, while an ordinate denotes the ratio in wear amount between the mounting inner side and the mounting outer side.

TABLE 2

| Lateral force G | Mountainous road (%) | General road (%) | High speed road (%) |
|---|---|---|---|
| 0~0.05 | 60.00 | 81.53 | 90.84 |
| 0.05~0.10 | 17.10 | 13.80 | 7.68 |
| 0.10~0.15 | 17.10 | 2.89 | 0.98 |
| 0.15~0.20 | 2.00 | 1.05 | 0.31 |
| 0.20~0.25 | 2.75 | — | — |

From the above results, it is seen that the ratio of the difference between the radius of curvature on the outer mounting side and the radius of curvature on the mounting inner side to the width of the tread, TW, is preferably from 0.75 to 1.50. If it is less than 0.75, wear amount of the tread on the mounting outer side is larger in the case of running on the mountainous road as compared with that on the mounting inner side, while if it is more than 1.50, the wear amount on the mounting inner side is too large in the case of running on high speed roads.

With reference to the results in FIG. 35, comparative experiments were carried out by using tires in Examples 1–3 and Comparative Examples 1–3 in Table 3.

TABLE 3(a)-1

|  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|
| Mounting outer side CR (mm) | 640 | 700 | 740 | 560 | 620 | 750 | 700 | 700 |
| Mounting inner side CR (mm) | 480 | 450 | 450 | 560 | 480 | 440 | 450 | 450 |
| CR difference (mm) | 160 | 250 | 290 | 0 | 140 | 310 | 250 | 250 |
| Average CR (mm) | 560 | 575 | 595 | 560 | 550 | 595 | 575 | 575 |
| Mounting outer side CR/TW | 3.2 | 3.5 | 3.7 | 2.8 | 3.1 | 3.75 | 3.5 | |
| Mounting inner side CR/TW | 2.4 | 2.25 | 2.25 | 2.8 | 2.4 | 2.2 | 2.25 | |
| Average CR/TW | 2.8 | 2.88 | 2.98 | 2.8 | 2.75 | 2.975 | 2.88 | |
| CR difference/TW | 0.8 | 1.25 | 1.45 | — | 0.7 | 1.55 | 1.25 | 1.25 |
| Mounting outer side negative ratio a | 12 | 12 | 12 | 20 | 12 | 12 | 20 | 3 |
| Mounting inner side negative ratio b | 20 | 20 | 20 | 20 | 20 | 20 | 20 | 20 |
| a/b | 0.6 | 0.6 | 0.6 | 1.0 | 0.6 | 0.6 | 1.0 | 0.15 |
| a + b/2 | 16 | 16 | 16 | 20 | 16 | 16 | 20 | 11.5 |
| Wet μ (peak) (index) | — | 93 | — | 100 | — | — | 100 | 70 |

TW: maximum ground-contact width (TW: 200 mm)

TABLE 3(b)-1

|  |  |  | Example 1 | Example 2 | Example 3 | Comparative Example 1 | Comparative Example 2 | Comparative Example 3 | Comparative Example 4 | Comparative Example 5 |
|---|---|---|---|---|---|---|---|---|---|---|
| Mountainous road | After 30,000 km running | Mounting outer side worn amount (mm) | 5.0 | 4.6 | 4.4 | 6.2 | 5.3 | 4.2 | 6.4 | 2.8 |
|  |  | Mounting inner side worn amount (mm) | 3.7 | 4.1 | 4.3 | 3.1 | 3.4 | 4.5 | 3.0 | 4.0 |
|  | After 50,000 km running | Mounting outer side worn amount (mm) | 7.5 | 7.2 | 6.9 | 9.9 | 8.0 | 6.4 | 10.1 | 4.2 |
|  |  | Mounting inner side worn amount (mm) | 6.0 | 6.3 | 6.7 | 4.9 | 5.5 | 7.2 | 4.8 | 6.0 |
| General road | After 30,000 km running | Mounting outer side worn amount (mm) | 2.8 | 2.5 | 2.2 | 3.5 | 3.1 | 2.0 | 3.7 | 1.9 |
|  |  | Mounting inner side worn amount (mm) | 2.3 | 2.5 | 2.8 | 2.1 | 2.0 | 3.0 | 2.0 | 2.4 |
|  | After 50,000 km running | Mounting outer side worn amount (mm) | 4.5 | 4.0 | 3.4 | 5.6 | 5.0 | 3.0 | 5.7 | 3.4 |
|  |  | Mounting inner side worn amount (mm) | 3.5 | 4.0 | 4.6 | 3.3 | 3.0 | 5.0 | 3.2 | 3.9 |
| High speed road | After 30,000 km running | Mounting outer side worn amount (mm) | 1.3 | 1.1 | 0.8 | 1.7 | 1.5 | 0.7 | 1.7 | 0.7 |
|  |  | Mounting inner side worn amount (mm) | 1.3 | 1.5 | 2.0 | 1.5 | 1.1 | 2.1 | 1.5 | 1.6 |
|  | After 50,000 km running | Mounting outer side worn amount (mm) | 2.0 | 1.7 | 1.2 | 2.5 | 2.3 | 1.1 | 2.5 | 1.0 |
|  |  | Mounting inner side worn amount (mm) | 2.0 | 2.2 | 2.8 | 2.0 | 1.7 | 2.9 | 2.0 | 1.9 |

TABLE 3(a)-2

|  | Example 4 | Example 5 | Comparative Example 6 | Comparative Example 7 | Example 6 | Example 7 | Comparative Example 8 | Comparative Example 9 | Example 8 |
|---|---|---|---|---|---|---|---|---|---|
| Mounting outer side CR (mm) | 700 | 700 | 700 | 700 | 700 | 700 | 700 | 700 | 700 |
| Mounting inner side CR (mm) | 450 | 450 | 450 | 450 | 450 | 450 | 450 | 450 | 450 |
| CR difference (mm) | 250 | 250 | 250 | 250 | 250 | 250 | 250 | 250 | 250 |
| Average CR (mm) | 575 | 575 | 575 | 575 | 575 | 575 | 575 | 575 | 575 |
| Mounting outer side CR/TW |  |  |  |  |  |  |  |  |  |
| Mounting inner side CR/TW |  |  |  |  |  |  |  |  |  |

TABLE 3(a)-2-continued

|  | Example 4 | Example 5 | Comparative Example 6 | Comparative Example 7 | Example 6 | Example 7 | Comparative Example 8 | Comparative Example 9 | Example 8 |
| --- | --- | --- | --- | --- | --- | --- | --- | --- | --- |
| Average CR/TW CR difference/TW | 1.25 | 1.25 | 1.25 | 1.25 | 1.25 | 1.25 | 1.25 | 1.25 | 1.25 |
| Mounting outer side negative ratio a | 6 | 16 | 18 | 25 | 12 | 12 | 12 | 5 | 20 |
| Mounting inner side negative ratio b | 20 | 20 | 20 | 20 | 15 | 30 | 40 | 30 | 30 |
| a/b | 0.3 | 0.8 | 0.9 | 1.25 | 0.8 | 0.4 | 0.3 | 0.2 | 0.6 |
| a + b/2 | 13 | 18 | 19 | 22.5 | 13.5 | 21 | 26 | 12.5 | 25 |
| Wet μ (peak) (index) | 85 | — | — | — | — | — | — | 83 | — |

TABLE 3(b)-2

|  |  |  | Example 4 | Example 5 | Comparative Example 6 | Comparative Example 7 | Example 6 | Example 7 | Comparative Example 8 | Comparative Example 9 | Example 8 |
| --- | --- | --- | --- | --- | --- | --- | --- | --- | --- | --- | --- |
| Mountainous road | After 30,000 km running | Mounting outer side worn amount (mm) | 3.5 | 4.9 | 5.1 | 5.8 | 3.7 | 4.7 | 4.7 | 3.0 | 4.9 |
|  |  | Mounting inner side worn amount (mm) | 3.3 | 4.1 | 4.0 | 4.2 | 3.4 | 4.4 | 4.9 | 3.9 | 4.5 |
|  | After 50,000 km running | Mounting outer side worn amount (mm) | 5.5 | 7.5 | 7.7 | 8.4 | 5.5 | 7.4 | 7.7 | 4.4 | 7.9 |
|  |  | Mounting inner side worn amount (mm) | 4.9 | 6.3 | 6.4 | 6.2 | 5.0 | 6.9 | 7.9 | 6.1 | 7.2 |
| General road | After 30,000 km running | Mounting outer side worn amount (mm) | 2.1 | 2.7 | 2.9 | 3.7 | 2.3 | 2.6 | 2.7 | 2.1 | 2.7 |
|  |  | Mounting inner side worn amount (mm) | 2.4 | 2.5 | 2.5 | 2.4 | 2.1 | 2.7 | 3.2 | 3.0 | 2.7 |
|  | After 50,000 km running | Mounting outer side worn amount (mm) | 3.6 | 4.3 | 4.5 | 5.7 | 3.7 | 4.1 | 4.3 | 3.0 | 4.5 |
|  |  | Mounting inner side worn amount (mm) | 4.0 | 4.0 | 3.9 | 4.2 | 3.5 | 4.3 | 5.0 | 4.6 | 4.5 |
| High speed road | After 30,000 km running | Mounting outer side worn amount (mm) | 0.9 | 1.2 | 1.5 | 2.0 | 1.0 | 1.2 | 1.1 | 0.9 | 1.4 |
|  |  | Mounting inner side worn amount (mm) | 1.5 | 1.3 | 1.2 | 1.5 | 1.3 | 1.7 | 2.0 | 1.5 | 1.6 |
|  | After 50,000 km running | Mounting outer side worn amount (mm) | 1.4 | 1.7 | 2.1 | 2.8 | 1.7 | 1.7 | 1.7 | 1.4 | 1.9 |
|  |  | Mounting inner side worn amount (mm) | 2.0 | 1.9 | 1.9 | 2.2 | 2.0 | 2.4 | 3.2 | 2.2 | 2.3 |

Comparative Examples 2 and 3 represent tires having too large CR (radius of curvature) difference/TW, and too small CR difference/TW, respectively. As compared with Examples 1–3, Comparative Example 2 more vigorously suffered wear predominantly on the mounting outer side on the mountainous road, while Comparative Example 3 more vigorously suffered from wearing predominantly on the mounting inner side when running on the high speed road.

The experimental conditions of each of the tires were the same given for the studies in FIGS. 21–23 above.

Figure 36A:
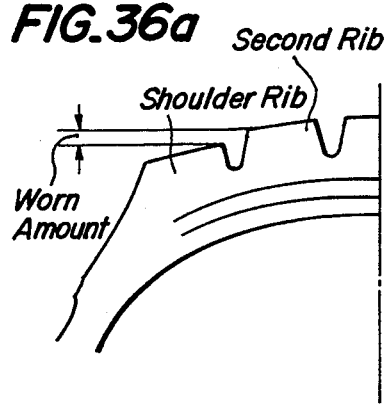
FIGS. 36a and 36b are schematic sectional views illustrating shoulder wearing and rib punching, respectively.
Figure 36B:
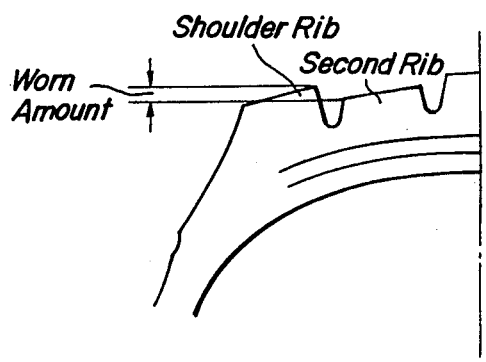
Figure 37:
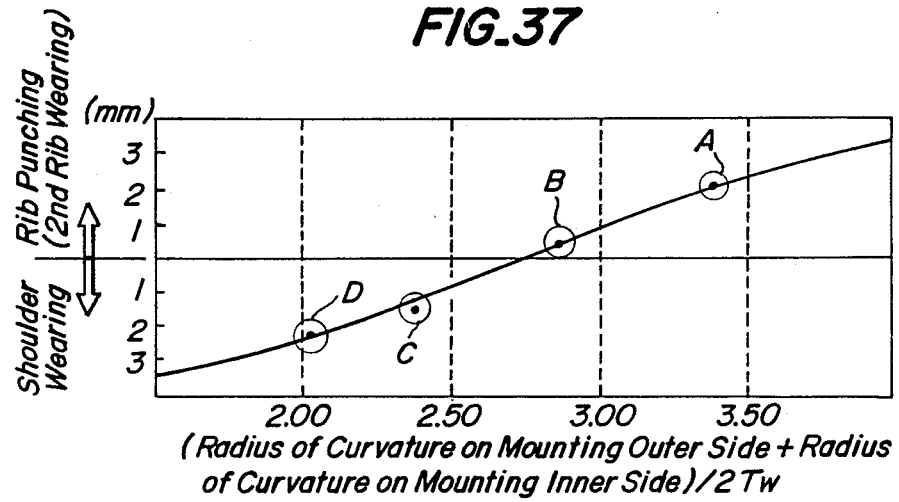
FIG. 37 is a diagram showing the relation between the average radius of curvature and the ratio between the shoulder wearing and the rib punching.

Comparative examination was carried out to study abnormal wearing degree on the mounting outer side with respect to the average radius of curvature $(R_2 + R_3/2)$ of the tread outer profile. In this experiment, wear amounts illustrated in FIGS. 36a and 36b were measured. FIG. 36a shows a generally so-called shoulder wear, while FIG. 36b does a rib punching. A test was carried out in the same running conditions as mentioned above, and the tires were run on the general roads for 50,000 km. Results are shown in FIG. 37. From the results, it is seen that the ratio of the average radius of curvature of the tread to the tread width is preferably from 2.5 to 3.0, while if it is out of this range, abnormal wearing of the shoulder wear or the rib punching becomes too larger, thereby shortening the use life of the tire. In FIG. 37, tires A, B, C and D had dimensions shown in Table 4.

TABLE 4

|  | A | B | C | D |
| --- | --- | --- | --- | --- |
| Mounting outer side CR (mm) | 800 | 700 | 600 | 510 |
| Mounting inner side CR (mm) | 550 | 450 | 350 | 310 |
| Average CR (mm) | 675 | 575 | 475 | 410 |
| Mounting outer side CR/TW | 4.00 | 3.5 | 3.00 | 2.55 |
| Mounting inner side CR/TW | 2.75 | 2.25 | 1.75 | 1.55 |
| Average CR/TW | 3.38 | 2.88 | 2.38 | 2.05 |

Next, in order to confirm the optimum value of the asymmetrical pattern of the tire, a comparison test was carried out according to a similar method as mentioned above by using tires in Examples 1–8 and Comparative Examples 4–9 in Table 3. From the results shown in Table 3, it is seen that the negative ratio, that is, the ratio of the area of the grooves to that of the whole tread is preferably not more than 25%. Further, it is preferable that the negative ratio of the tread portion having the larger radius is from 0.3 to 0.8 times as much as that of the tread portion having the smaller radius of curvature. If the ratio of the area of the grooves to that of the whole tread is more than 25%, the wear amount of the whole tread becomes extremely larger as in the case of Comparative Example 8. Incidentally, if the negative ratio of the tread portion having the large radius of curvature is smaller than 0.3 of that of the tread portion having the smaller radius of curvature, wear predominantly occurs in the mounting inner side, while if it is inversely larger than 0.8 times, as in Comparative Examples 4, 6 and 7, the tread portion on the mounting outer side wears faster than on the mounting inner side.

In order to determine the lower limit of the negative ratio of the tread surface, each tires in Examples 2 and 5 and Comparative Examples 1, 4, 5 and 9 in Table 3 was mounted to a trailer under traction, and run on a wet road at a speed of 60 km/hr under an internal pressure of 7.75 kg/cm$^2$ and 100% loading.

In this state, a peak of a coefficient of friction on wet road (wet $\mu$) was measured. Results are also shown in Table 3 by index taking a value of the tire in Comparative Example 1 as 100. The wet $\mu$ of the tire in Comparative Example 1 was 0.46.

From the above results, it is understood that the wet skid performance is extremely damaged when the negative ratio is less than 12%.

Further, it has been revealed that the ratio of the larger radius of curvature of the tread to the tread width is preferably from 2.90 to 3.70, while the ratio of the smaller radius of curvature of the tread to the trade width is preferably from 2.25 to 2.60.

What is claimed is:

1. A heavy duty pneumatic tire to be mounted on a wheel comprising; a tread, two sidewalls, two beads, a radial carcass and a belt composed of at least two plies, of which cords are intersected in the adjacent plies said sidewalls and said carcass arranged substantially symmetrical with the equatorial plane of said tire; wherein the radius of curvature of the contour of the tread appearing in a tire cross section including a tire rotary axis is asymmetrical with respect to the tire equatorial plane; a larger radius of curvature and a smaller radius of curvature are given to sides of the tire located outside and inside respectively when the tire is mounted on a wheel; the difference between the larger radius of curvature and the smaller radius of curvature is not less than 70 mm; the rigidity of the tread is larger on the side of the tread with the larger radius of curvature than on the side of the tread with the smaller radius of curvature, when said tire is mounted on a wheel and inflated to a normal inflation pressure arcs of the contour of said tread having the larger and smaller radii of curvature have a common tangent at the equator of said tire, and wherein the larger radius of curvature is from 2.90 to 3.70 times as much as the width of the tread, and the smaller radius of curvature is from 2.25 to 2.60 times as much as the width of the tread.

2. A heavy duty pneumatic tire according to claim 1, wherein the difference between the larger radius of curvature and the smaller radius of curvature is not less than 150 mm and not more than 300 mm.

3. A heavy duty pneumatic tire according to claim 1, wherein the difference between the larger radius of curvature and the smaller radius of curvature is from 0.75 to 1.5 times as much as the width of the tread.

4. A heavy duty pneumatic tire according to claim 1, wherein an average value of the larger radius of curvature and the smaller radius of curvature is from 2.5 to 3.0 times as much as the width of the tread.

5. A heavy duty pneumatic tire according to claim 1, wherein a narrow groove is circumferentially provided in a tread shoulder portion of the tread portion having the smaller radius of curvature, the width and depth of said narrow groove are not more than 5 mm and not less than 30% of that of main grooves, respectively and the location of the narrow groove is so set that A/TW is from 0.02 to 0.15 in which A and TW are the distance from the edge of the tread to a position at which the narrow groove is provided and a width of the tread, respectively.

6. A heavy duty pneumatic tire according to claim 5, wherein the sectional profile of the narrow groove at the shoulder portion is in a tear-like shape.

7. A heavy duty pneumatic tire according to claim 1, wherein the thickness of the tread is larger in the tread portion having the larger radius of curvature than in the tread portion having the smaller radius of curvature, and the depth of a main groove in the tread portion having the larger radius of curvature is larger by difference in thickness between the tread portions having the larger and smaller radii of curvature, respectively than that of a main groove in the tread portion having the smaller radius of curvature.

8. A heavy duty pneumatic tire according to claim 1, wherein opposite shoulder portions of the tread are made of an NR base rubber and second ribs and the center portion thereof are made of an SBR base rubber.

9. A heavy duty pneumatic tire according to claim 8, wherein the boundary of the NR base rubber and the SBR base rubber is located in the center of a circumferential main groove extending in a tire circumferential direction between the shoulder portion and the second rib.

10. A heavy duty pneumatic tire according to claim 8, wherein the NR base rubber contains not less than 80 PHR of NR.

11. A heavy duty pneumatic tire according to claim 9, wherein the NR base rubber contains not less than 80 PHR of NR.

12. A heavy duty pneumatic tire according to claim 8, wherein the SBR base rubber contains not less than 30 PHR of SBR.

13. A heavy duty pneumatic tire according to claim 9, wherein the SBR base rubber contains not less than 30 PHR of SBR.

14. A heavy duty pneumatic tire according to claim 1, wherein the area ratio of a grooved portion of the surface of the tread which is brought into no contact with ground is from 5 to 30% in the tread portion having the larger radius of curvature and from 10 to 40% in the tread portion having the smaller radius of curvature, and the area ratio in the tread portion having the larger radius of curvature is smaller than that in the tread portion having the smaller radius of curvature.

15. A heavy duty pneumatic tire according to claim 14, wherein the ratio of the area of the grooves which is not brought into contact with the ground to the area of the whole tread is from 12 to 25%, and the ratio of a negative ratio of the tread portion having the smaller radius of curvature to that of the tread portion having the larger radius of curvature is from 0.3 to 0.8.

16. A heavy duty pneumatic tire according to claim 14, wherein the depth of at least one groove in the tread portion having the larger radius of curvature is deeper than that of a groove in the tread portion having the smaller radius of curvature.

17. A heavy duty pneumatic tire according to claim 1, wherein the center of the width of at least one of the plural belt layers in the tire rotary direction is deviated toward the wheel-mounting outside of the tire from the tire equatorial plane.

18. A heavy duty pneumatic tire to be mounted on a wheel comprising; a tread, two sidewalls, two beads, a radial carcass and a belt composed of at least two plies of which cords are intersected in the adjacent plies, wherein the radius of curvature of the contour of the tread appearing in a tire cross section including a tire rotary axis is asymmetrical with respect to the tire equatorial plane; a larger radius of curvature and a smaller radius of curvature are given to sides of the tire located outside and inside respectively when the tire is mounted on a wheel; the difference between the larger radius of curvature provided from the tire equatorial plane to the edge side of the tread of the tire located outside when the tire is mounted on the wheel and the smaller radius of curvature provided from the tire equatorial plane to the edge side of the tread of the tire located inside when the tire is mounted to the wheel is not less than 70 mm; the rigidity of the tread is larger on the side of the tread with the larger radius of curvature than on the side of the tread with the smaller radius of curvature, wherein the larger radius of curvature is from 2.90 to 3.70 times as much as the width of the tread, and the smaller radius of curvature is from 2.25 to 2.60 times as much as the width of the tread.

19. A heavy duty pneumatic tire according to claim 18, wherein the difference between the larger radius of curvature and the smaller radius of curvature is not less than 150 mm and not more than 300 mm.

20. A heavy duty pneumatic tire according to claim 18, wherein the difference between the larger radius of curvature and the smaller radius of curvature is from 0.75 to 1.5 times as much as the width of the tread.

21. A heavy duty pneumatic tire according to claim 18, wherein an average value of the larger radius of curvature and the smaller radius of curvature is from 2.5 to 3.0 times as much as the width of the tread.

22. A heavy duty pneumatic tire according to claim 18, wherein a narrow groove is circumferentially provided in a tread shoulder portion of the tread portion having the smaller radius of curvature, the width and depth of said narrow groove are not more than 5 mm and not less than 30% of that of main grooves, respectively and the location of the narrow groove is so set that A/TW is from 0.02 to 0.15 in which A and TW are the distance from the edge of the tread to a position at which the narrow groove is provided and a width of the thread, respectively.

23. A heavy duty pneumatic tire according to claim 22, wherein the sectional profile of the narrow groove at the shoulder portion is in a tear-like shape.

24. A heavy duty pneumatic tire according to claim 18, wherein the thickness of the tread is larger in the tread portion having the larger radius of curvature than in the tread portion having the smaller radius of curvature, and the depth of a main groove in the tread portion having the larger radius of curvature is larger by difference in thickness between the tread portions having the larger and smaller radii of curvature, respectively, than that of a main groove in the tread portion having the smaller radius of curvature.

25. A heavy duty pneumatic tire according to claim 18, wherein opposite shoulder portions of the tread are made of an NR base rubber and second ribs and the center portion thereof are made of an SBR base rubber.

26. A heavy duty pneumatic tire according to claim 25, wherein the boundary of the NR base rubber and the SBR base rubber is located in the center of a circumferential main groove extending in a tire circumferential direction between the shoulder portion and the second rib.

27. A heavy duty pneumatic tire according to claim 25, wherein the NR base rubber contains not less than 80 PHR of NR.

28. A heavy duty pneumatic tire according to claim 26, wherein the NR base rubber contains not less than 80 PHR of NR.

29. A heavy duty pneumatic tire according to claim 25, wherein the SBR base rubber contains not less than 30 PHR of SBR.

30. A heavy duty pneumatic tire according to claim 26, wherein the SBR base rubber contains not less than 30 PHR of SBR.

31. A heavy duty pneumatic tire according to claim 18, wherein the area ratio of a grooved portion of the surface of the tread which is brought into no contact with ground is from 5 to 30% in the tread portion having the larger radius of curvature and from 10 to 40% in the tread portion having the smaller radius of curvature, and the area ratio in the tread portion having the larger radius of curvature is smaller than that in the tread portion having the smaller radius of curvature.

32. A heavy duty pneumatic tire according to claim 31, wherein the ratio of the area of the grooves which is not brought into contact with the ground to the area of the whole tread is from 12 to 25%, and the ratio of a negative ratio of the tread portion having the smaller radius of curvature to that of the tread portion having the larger radius of curvature is from 0.3 to 0.8.

33. A heavy duty pneumatic tire according to claim 31, wherein the depth of at least one groove in the tread portion having the larger radius of curvature is deeper than that of a groove in the tread portion having the smaller radius of curvature.

34. A heavy duty pneumatic tire according to claim 18, wherein the center of the width of at least one of the plural belt layers in the tire rotary direction is deviated toward the wheel-mounting outside of the tire from the tire equatorial plane.

* * * * *